H. R. BACON & E. T. MALLOY.
ADVERTISING DEVICE.
APPLICATION FILED JAN. 29, 1915.
1,195,171.
Patented Aug. 22, 1916.
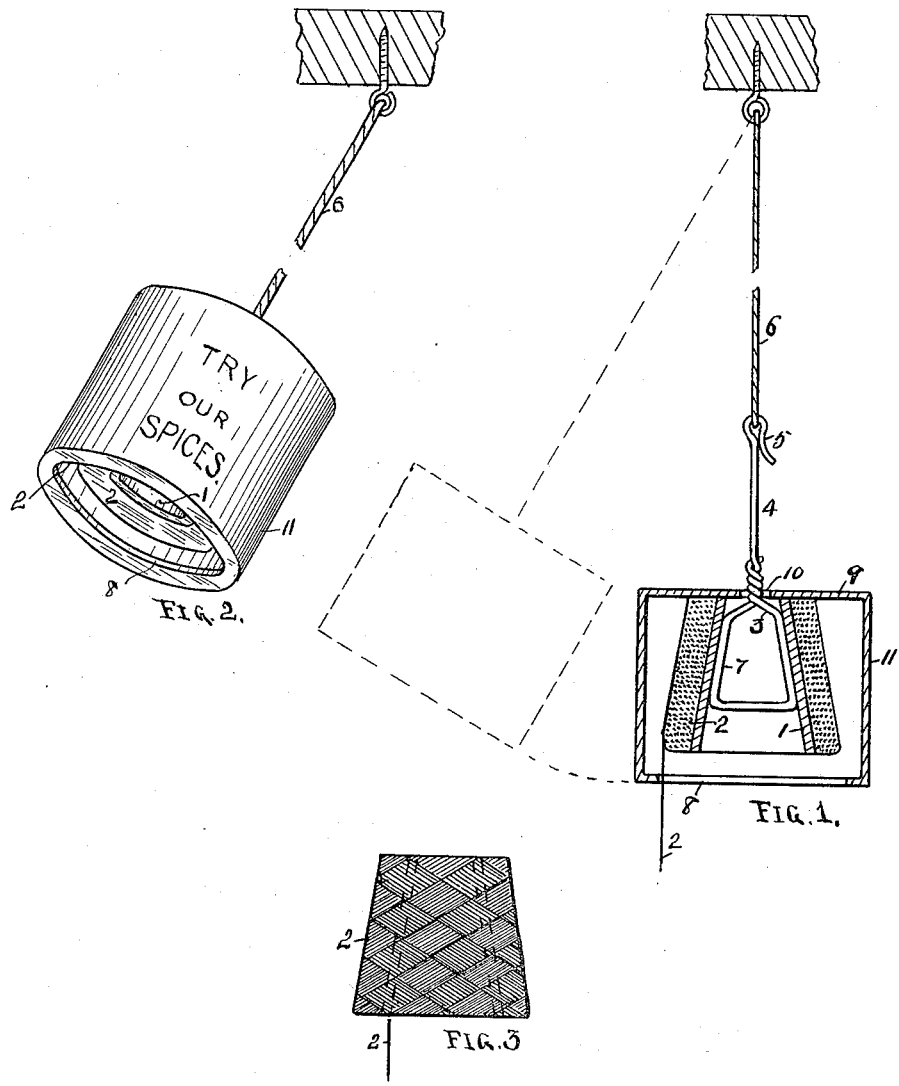
WITNESSES.
James J. Carr
Herbert Skinner
INVENTORS.
Harry R. Bacon,
and Edward T. Malloy.
By Robert S. Carr, Attorney.

UNITED STATES PATENT OFFICE.

HARRY R. BACON AND EDWARD T. MALLOY, OF HAMILTON, OHIO.

ADVERTISING DEVICE.

1,195,171.  Specification of Letters Patent.  Patented Aug. 22, 1916.

Application filed January 29, 1915. Serial No. 5,053.

*To all whom it may concern:*

Be it known that we, HARRY R. BACON and EDWARD T. MALLOY, citizens of the United States, residing at Hamilton, Butler county, Ohio, have invented a new and useful Improvement in Advertising Devices, of which the following is a specification.

Our invention relates to advertising devices of the class adapted to be used in stores or elsewhere within doors, and the objects of our improvements are to provide a hood or casing for a suspended ball of wrapping twine on the surface of which advertisements may be displayed; to provide a suspending member for the twine which offers little resistance to torsional movement; to provide means for imparting a rotative movement to the ball and hood that they may continue to oscillate in approaching a state of rest and to provide simple and cheap construction for obtaining facility of operation and efficiency of action. These objects may be attained in the following described manner as illustrated in the accompanying drawings, in which:—

Figure 1 is a diametrical section of an advertising device embodying our improvements; Fig. 2 a perspective view; and Fig. 3 an elevation of a ball of wrapping twine of the preferred form of the frustum of a cone.

In the drawings, 1 represents the core which usually consists of a tapered tube formed of straw-board whereon the twine 2 may be wound in a diagonal or helical direction, as shown in Fig. 3. A support 3 preferably consisting of a wire formed at one end with a shank 4 terminating in a hook 5 and at the other end in a tapering form 7 adapted to wedge within the core for suspending it therefrom.

A member 6 depending from a fixed point may be attached to the support for properly suspending the ball at the desired elevation. Said member may consist of a cord or any substitute therefor which will offer little resistance to torsional movement. A hood or casing 11 preferably cylindrical in form with a large circular opening 8 through its bottom to admit the ball of twine therein is provided with a closed top 9 having a small axial opening 10 therethrough for the removable insertion of the shank of the support as shown in Fig. 1.

The hood serves to protect the twine from dust and dirt and by resting on the top of the ball prevents the twine when unwinding from becoming entangled with said shank of the wire support. Any desired advertisements may be displayed on the surface of the hood or supported thereon in any desired manner.

In operation the support may be properly secured within the core of the ball and the shank inserted through the axial opening in the closed end of the hood with the ball within the hood in contact with its cover as shown in Fig. 1. The hook of the shank may then be secured to the depending torsional member. In wrapping the merchandise the pull necessary to unwind the twine is sufficient to impart a rotative movement to the ball and the hood. When the pull on the twine is discontinued the ball with the hood will continue to automatically rotate alternately in opposite directions until they reach the normal state of rest, thus exposing the advertisements repeatedly to different points of observation.

What we claim as our invention and desire to secure by Letters Patent of the United States is:—

The combination with a ball of twine in form the frustum of a cone, and a tapered hollow core therein formed with open ends, of a tapered wire support adapted to be removably secured within the core and formed with a vertically extended portion terminating in a hook, a torsionally movable member adapted to detachably engage with said hook for suspending the support with the ball from a fixed point, and a hood supported on the ball, and adapted to the display of advertising matter exposed thereon, whereby alternating rotative motion of the ball with the hood may continue automatically for a time after being started by a pull on the free end of the cord, for the purposes specified.

HARRY R. BACON.
E. T. MALLOY.

Witnesses:
HARRY J. KREHLER, Jr.,
R. S. CARR.

Copies of this patent may be obtained for five cents each, by addressing the "Commissioner of Patents, Washington, D. C."